United States Patent [19]

Selz

[11] Patent Number: 4,529,515
[45] Date of Patent: Jul. 16, 1985

[54] VALVE

[75] Inventor: Alois Selz, Freiburg, Fed. Rep. of Germany

[73] Assignee: Surculus Aktiengesellschaft, Vaduz, Liechtenstein

[21] Appl. No.: 570,430

[22] Filed: Jan. 13, 1984

Related U.S. Application Data

[63] Continuation of Ser. No. 391,470, Jun. 23, 1982, abandoned.

[30] Foreign Application Priority Data

Jul. 4, 1981 [DE] Fed. Rep. of Germany ....... 3126507

[51] Int. Cl.$^3$ .................. B01D 27/08; B01D 35/02
[52] U.S. Cl. .................... 210/234; 210/235; 210/238; 210/420; 210/432; 210/444; 251/331
[58] Field of Search .................. 210/85, 91, 232, 234, 210/235, 238, 420, 429–432, 440, 443, 444, 450; 251/331

[56] References Cited

U.S. PATENT DOCUMENTS

| Re. 19,151 | 5/1934 | Saunders | 251/331 |
|---|---|---|---|
| 1,171,116 | 2/1916 | Haeseler | 210/432 X |
| 1,840,883 | 1/1932 | Brecher | 210/232 |
| 2,716,017 | 8/1955 | Linker | 251/331 |
| 2,945,591 | 7/1960 | Pall | 210/234 |
| 3,262,570 | 7/1966 | Gailitis et al. | 210/444 X |
| 3,368,679 | 2/1968 | Bozek | 210/234 X |
| 3,476,251 | 11/1969 | Kudlaty | 210/232 |
| 3,511,472 | 5/1970 | Zimmerman | 251/331 X |
| 3,684,100 | 8/1972 | Close | 210/444 |
| 3,695,449 | 10/1972 | Scaglione | 210/432 X |
| 3,715,032 | 2/1973 | Nicko | 210/234 X |
| 3,756,275 | 9/1973 | Barrera | 210/444 X |
| 3,826,466 | 7/1974 | Scaglione | 210/432 X |
| 3,907,688 | 9/1975 | Close | 210/444 X |
| 3,935,106 | 1/1976 | Lipner | 210/444 X |
| 3,982,520 | 9/1976 | Wheeler | 210/444 X |
| 4,077,876 | 3/1978 | Southall | 210/235 X |
| 4,082,673 | 4/1978 | Cilento | 210/234 |
| 4,379,053 | 4/1983 | Brane | 210/234 |

FOREIGN PATENT DOCUMENTS

| 1021261 | 2/1953 | France | 210/429 |
|---|---|---|---|
| 1070029 | 5/1967 | United Kingdom . | |

Primary Examiner—Robert Spitzer
Attorney, Agent, or Firm—Peter K. Kontler

[57] ABSTRACT

A valve whose casing has two coaxial passages and a chamber disposed between the passages and receiving a valving element movable between an open position in which the passages are free to communicate with one another and a closed position in which the passages are fully sealed from each other. The housing is separably connected with a casing for a tubular filter through which the fluid entering via one of the passages flows on its way toward the other passage when the valving element is held in the open position. The casing can be detached from the housing only when the valving element is held in the closed position to thus prevent leakage or spillage of fluid from the housing on detachment of the casing. The valving element can include a rotary body or a membrane and a displacing member which latter is reciprocable in the chamber to move the membrane against an annular seat of the housing.

25 Claims, 12 Drawing Figures

VALVE

This application is a continuation, of application Ser. No. 391,470, filed June 23, 1982, now abandoned.

BACKGROUND OF THE INVENTION

The present invention relates to valves in general, and more particularly to improvements in valves which are, or which can be, equipped with means for influencing the fluid flowing therethrough. The expression "influencing" means is intended to embrace a filter, a device which determines a particular characteristic (such as the temperature, pressure, rate of flow and/or others) of the conveyed fluid, a device which removes samples of conveyed fluid, or a combination of such devices. Still more particularly, the invention relates to improvements in valves wherein the valving element is disposed between first and second passages which are defined by the valve housing or body and respectively serve for admission of a fluid (particularly a hydraulic fluid) into and for evacuation of the fluid from the housing. Such valves are often used in hydraulic pipe lines to allow for monitoring of the characteristics of conveyed fluid, to allow for admission of controlled quantities of one or more additives, to allow for filtering or otherwise cleaning of the conveyed fluid and/or to allow for removal of samples at regular or irregular intervals.

A drawback of presently known valves which are equipped with removable or interchangeable fluid-influencing inserts or components is that the fluid is likely to spill when the housing is opened to allow for insertion of a fresh component or for removal of a previously inserted component. Attempts to prevent uncontrolled outflow of fluid include the provision of a shutoff valve at the inlet side of the valve housing, the provision of discrete shutoff valves at the inlet and outlet sides of the housing, or the provision of a shutoff valve at the inlet side and a check or non-return valve at the outlet side of the housing. This contributes significantly to the overall cost of the valve and, moreover, a check valve cannot always ensure adequate sealing of the outlet side against leakage of fluid on removal of a portion of the housing so as to gain access to the fluid-influencing component.

It was further proposed to provide a valve which contains a removable fluid-influencing component with a switchover device which is designed to allow the incoming hydraulic fluid to flow from the inlet toward the outlet and through a filter or an analogous component, or directly from the inlet to the outlet (i.e., so that the fluid bypasses the filter). The switchover device is actuatable by a spring which is installed in the path of the conveyed fluid. Such mode of preventing leakage on opening of the housing is also unreliable because the spring is dependent upon the flow conditions, i.e., such switchover devices also cannot reliably ensure that no fluid will escape when the operator wishes to gain access to a previously inserted fluid-influencing component or to provide room for insertion of a fresh component. The problem is aggravated when the conveyed fluid is a corrosive, explosive or otherwise hard-to-handle substance which should be kept out of contact with the hands of the operators, with the surrounding atmosphere, and/or with unprotected portions of the valve. Moreover, and especially if the valve includes a switchover device and the fluid-influencing component is a filter, the fluid which flows through the housing of the valve while the switchover device is activated (i.e., while an attendant exposes the space for reception of a filter) does not undergo any filtering or analogous cleansing action. This might adversely influence the parts which receive fluid from a pipe line or another fluid conveying system wherein the valve is installed.

OBJECTS AND SUMMARY OF THE INVENTION

An object of the invention is to provide a novel and improved valve wherein the component or components which are designed to influence the fluid flowing through the housing of the valve are accessible without risking any, or without risking appreciable, spillage of the fluid.

Another object of the invention is to provide a simple, compact and relatively inexpensive but reliable valve wherein the flow of fluid from the inlet to the outlet of the valve housing is invariably prevented when the housing is opened, either entirely or in part, in order to afford access to a filter or to another fluid-influencing component.

A further object of the invention is to provide a valve wherein the flow of fluid from the inlet to the outlet of the housing and/or spillage of the fluid is automatically prevented when the attendants are in a position to remove a filter or another fluid-influencing component from, or to insert such component into, the valve.

An additional object of the invention is to provide a novel and improved valve housing and a novel and improved valving element for use in a valve of the above outlined character.

A further object of the invention is to provide novel and improved means for confining a filter or another fluid-influencing component when the valve is in actual use, and to provide a novel and improved fluid-influencing component for use in the valve.

An additional object of the invention is to provide a valve wherein the valving element must assume a predetermined position when the fluid-influencing component is accessible or insertable into the housing or into an attachment to the housing.

A further object of the invention is to provide a novel and improved method of manipulating a valve preparatory to, during and subsequent to insertion or removal of a fluid-influencing component, such as a tubular or otherwise configurated filter.

Another object of the invention is to provide a valve which exhibits the above outlined features and can be installed in existing conduits or pipe lines as a superior substitute for heretofore known valves.

The invention is embodied in a valve which comprises a housing having a fluid-admitting first passage, a fluid-discharging second passage which is preferably coaxial with the first passage, and a chamber between the two passages. The valve further comprises a hollow casing which is provided on and is preferably separably coupled to the housing, at least one fluid-influencing component (e.g., a tubular filter) in the casing, a valving element in the chamber, and means for moving the valving element between a first position in which the valving element seals the passages from one another and preferably also from the chamber as well as from the interior of the casing, and a second position in which the passages are free to communicate with one another and at least one of the passages communicates with the interior of the casing. The arrangement is preferably such that both passages communicate with the interior of the casing in the second position of the valving element so as to allow the fluid which enters the housing via the first passage to be influenced (e.g., filtered) by the component in the casing while flowing toward the second passage.

The valving element can be provided with discrete first and second channels which communicate with the respective passages in the second position of the valving element; the channels can communicate with one another through the interior of the casing, at least in the second position of the valving element. The housing preferably comprises sealing elements (e.g., elastically deformable rings) which are installed in the housing to seal the channels from the passages in the first position of the valving element. The sealing elements are preferably installed in the chamber and flank the valving element, especially if the latter constitutes a rotary sphere, cone or an analogous body. If the fluid-influencing component is a filter, it may constitute a hollow tubular body which is installed in the casing in such a way that one of the channels admits fluid to its outer side and the other channel receives fluid which has passed through the filter and to its inner side when the valving element is held in the second position.

The outlet of one of the channels in the valving element (particularly if the latter comprises a cone, a sphere or an analogous rotary body) is preferably separated from the inlet of the other channel. For example, the valving element can comprise a partition which separates the outlet of the first channel from the inlet of the second channel. The inlet of the second channel may be a substantially annular bore which surrounds the outlet of the first channel, or vice versa. If the valving element is rotatable between the first and second positions, its axis of rotation is preferably normal to the common axis of the passages in the housing. At least one of the channels in a spherical, conical or like valving element can resemble an elbow one end of which is coaxial with the respective passage when the valving element is held in the second position and the other end of which is coaxial with the means for rotating the valving element. For example, the means for rotating the valving element can be designed to move the valving element through angles of 90 degrees.

Alternatively, the valving element can comprise at least one membrane which is installed in the chamber and a displacing member which is also installed in the chamber and is movable (preferably reciprocable) by the moving means to effect movements of the membrane between first and second positions in which the membrane respectively seals the passages from one another and permits a fluid to flow from the first into the second passage by flowing through the casing (or through a portion of the casing) on its way to the second passage. The housing then defines a seat and has an opening which is surrounded by the seat and communicates with the interior of the casing. The membrane bears against the seat to seal the opening of the housing from one of the passages in the first position of the membrane. Such membrane can be formed with a centrally disposed aperture which communicates with the other passage and with the interior of the casing in the second position of the membrane. The displacing member is preferably movable relative to as well as with the membrane, and the valve then preferably further comprises a diaphragm which is installed in the chamber to seal the valving element from the moving means.

The casing is preferably separable (at least in part) from the housing, and the valve then further comprises means for releasably coupling the casing to the housing as well as means for locking the coupling means in the second position of the valving element so that the casing can be separated from the housing only and alone when the valving element is held in the first position in which the passages are sealed from one another. The coupling means can comprise at least one coupling member which is movably mounted on the housing or on the casing and is movable into and from retaining engagement with the casing or with the housing in the first position of the valving element. For example, the coupling member can constitute or comprise a lever having an eccentric portion which engages the casing or the housing when the lever is held in retaining engagement with the casing or housing. The locking means can comprise a device which holds the coupling member against movement from retaining engagement with the casing or with the housing in the second position of the valving element. Such device can comprise or constitute a yoke which is turnable between first and second positions in which it respectively holds the coupling member against movement and permits the coupling member to move from retaining engagement with the casing or housing. If the valving element is rotatable between its first and second positions, the yoke can be installed on and can be rotatable by the moving means for the valving element, i.e., the yoke can be rotated simultaneously with the valving element.

Alternatively, and especially if the valving element includes a membrane and a displacing member for the membrane, the moving means can comprise a feed screw which can reciprocate the displacing member and is rotatably mounted in the housing. The moving means then further comprises a handgrip member (e.g., a hand wheel) which can rotate the feed screw and means for separably securing the handgrip member to the housing. Such valve can further comprise bolts or analogous means for separably fastening the casing to the housing, and the fastening means is preferably accessible only when the handgrip member is detached from the housing. This, in turn, can take place only when the valving element is held in the first position. Thus, the valve can comprise means for blocking the detachment of the handgrip member from the housing in the second position of the valving element. The means for securing the handgrip member to the housing can comprise a screw having a socket which is bounded by a polygonal surface. Such surface must be engaged by a tool to detach the screw from the housing and to thus allow for removal of the handgrip member which, in turn, affords access to the fastening means. The blocking means can comprise a stud, a post or an otherwise configurated projection which extends into and preferably beyond the socket in the second position of the valving element but is automatically at least partially retracted from or into the socket, e.g., in response to rotation of the feed screw, on movement of the valving element to its first position.

If the fluid-influencing component is a filter, it can be provided with a tubular extension which projects into the outlet of the first channel or into the inlet of the second channel in the valving element. If the filter is a tubular body, it can be installed in the casing or in the housing in such a way that fluid which enters the housing through the first passage and thereupon flows through the first channel enters the filter through the extension, passes radially outwardly through the filter, and thereupon flows into the second channel on its way into the second passage while the valving element is held in the second position. Alternatively, the fluid which enters through the first passage can flow through the first channel, into an annular space surrounding the filter, radially inwardly through the filter, through the extension and second channel and thereupon into the second passage, again while the valving element is held in the second position.

The filter or another fluid-influencing component can be provided with internal or external threads mating with external or internal threads of the housing to releasably hold the component in the interior of the casing. The component can include a sleeve-like portion with external threads and with at least one slot through which the fluid can flow, at least in the second position of the valving element.

If the valving element comprises a membrane, the valve can further comprise a ring-shaped sealing device which is disposed in the chamber between the membrane and the diaphragm and spacedly surrounds the displacing member. The ring-shaped sealing device preferably defines a path (e.g., by being provided with a radially extending bore) through which the fluid can flow between the passages of the housing, particularly between an axial aperture of the membrane and the second passage. If the valving element comprises a membrane, the fluid-influencing component can be provided with threads which mesh with complementary threads of the membrane to separably connect a tubular extension of the component with the membrane. The filter can be installed for reciprocatory movement in the casing, and the valve can further comprise means for biasing the filter in a direction to urge the valving element to its second position. Such biasing means can comprise a coil spring or another resilient element.

The casing can be provided with a sealable outlet for evacuation of fluid from its interior.

The novel features which are considered as characteristic of the invention are set forth in particular in the appended claims. The improved valve itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
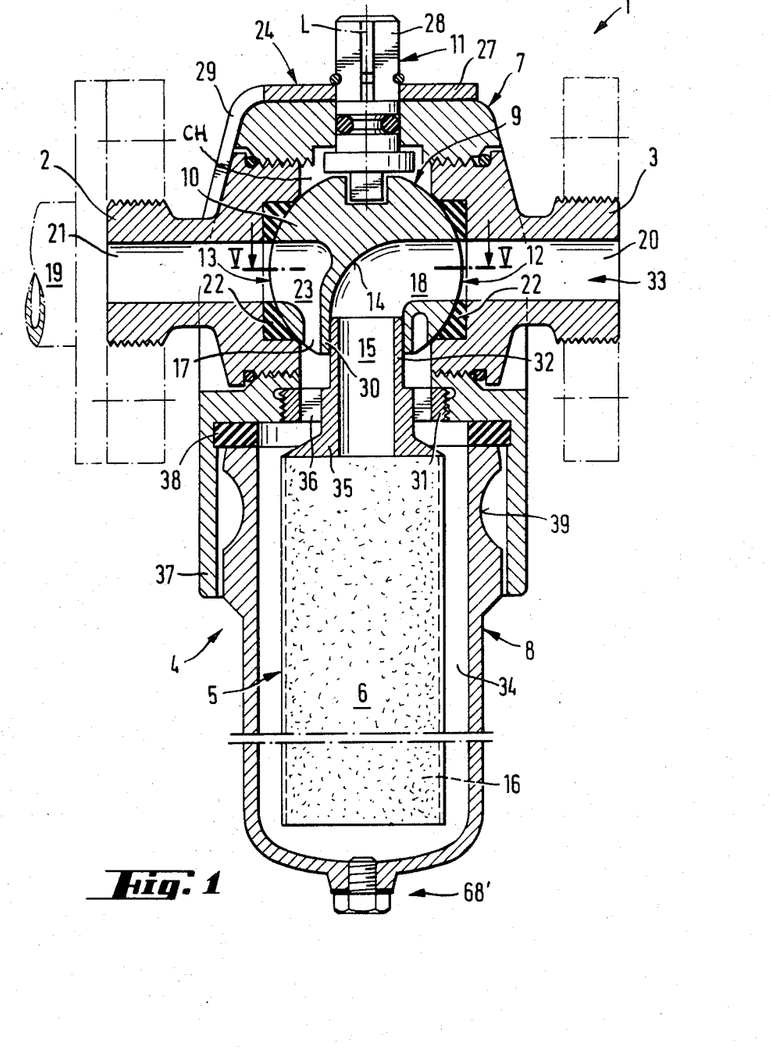
FIG. 1 is an axial sectional view of a valve which embodies one form of the invention and comprises a rotary spherical valving element which is shown in open position, the section being taken in the direction of arrows as seen from the line I—I of FIG. 3.
Figure 2:
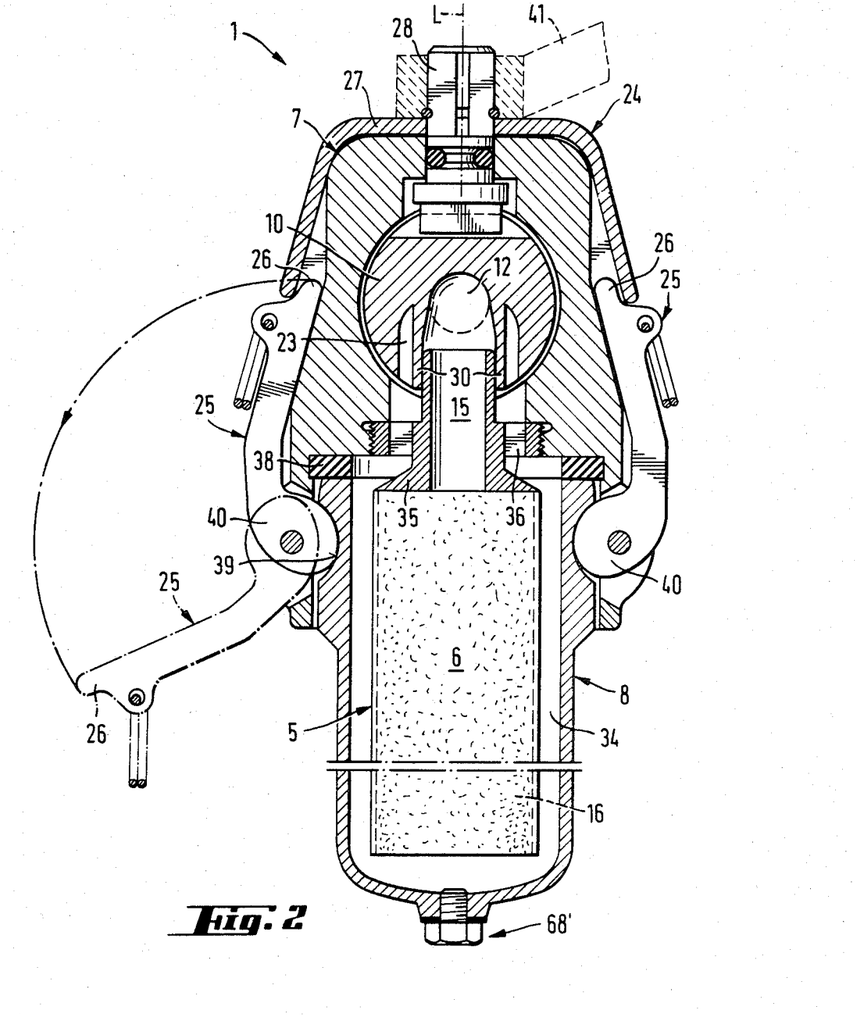
FIG. 2 is another axial sectional view of the valve as seen in the direction of arrows from the line II—II of FIG. 3.

FIGS. 1 to 7 show a first valve 1 which can be installed in a pipe line 19 to convey a stream of gaseous or liquid fluid in a direction from the left to the right, or vice versa, as viewed in FIG. 1. The valve 1 comprises a main housing or body 7 with two coaxial flanges 2 and 3 which can be bolted or otherwise releasably secured to the corresponding sections of the pipe line 19. The housing or body 7 contains a valving element 9 including a sphere 10 and supports an attachment 4 serving to accommodate one or more inserts or components 5 which can influence (e.g., filter or otherwise clean) the fluid flowing from the interior of the flange 3 toward the interior of the flange 2 or vice versa. In the illustrated embodiment, the insert 5 is or comprises a tubular filter 6, a so-called filter candle. However, it is equally within the purview of the invention to employ inserts in the form of thermometers, pressure gauges, nozzles for admixture of additives to the stream of fluid flowing through the housing 7, and/or others. The attachment 4 comprises a hollow casing 8 which is separably coupled to the housing 7 and contains the component 5.

The sphere 10 of the valving element 9 is rotatable about the axis L (see FIG. 1) between a first or closed position in which it prevents the flow of fluid (normally a liquid) between the flanges 2, 3 as well as into the casing 8 or from the casing 8 into the housing 7. When the valving element 9 is held in a second or open position, shown in FIG. 1, the fluid flows from the interior of the flange 3, into the interior of the filter 6, into the annular space 34 surrounding the filter 6, and thence into the interior of the flange 2 on its way toward the left-hand section of the pipe line 19.

The sphere 10 is formed with two separate channels 18 and 23 one of which receives fluid from the interior of the flange 3 and the other of which admits fluid into the interior of the flange 2. The two channels are not in communication with each other. In FIG. 1, the intake end or inlet 12 of the substantially L-shaped or elbow-shaped channel 18 communicates with the fluid-admitting passage 33 in the flange 3, and its arcuate central portion 14 then conveys the inflowing fluid to the discharge end or outlet 15. The latter admits the fluid into the internal space 16 of the filter 6 in the casing 8. The fluid penetrates through the circumferentially complete wall of the tubular filter 6 and flows into the internal space 34 of the casing 8 and thence into the intake end or inlet 17 of the second channel 23 in the sphere 10. The outlet 13 of the channel 23 admits filtered fluid into a fluid-discharging passage 21 which is surrounded by the flange 2 and communicates with the interior of the illustrated section of the pipe line 19. The reference character 20 denotes the inlet of the passage 33.

The housing 7 of the valve 1 further contains two sealing elements 22 which flank the sphere 10 of the valving element 9 and surround the inner end portions of the passages 33 and 21. These sealing elements are elastic rings which bear against the adjacent portions of the external surface of the sphere 10 to prevent the flow of fluid from the passage 33 into the passage 21 when the sphere 10 is rotated (about the axis L) through 90° from the second position which is shown in FIG. 1. The axis L is normal to the common axis of the flanges 2 and 3 forming part of the valve housing 7. The passage 21 is preferably coaxial with the passage 21 as well as with the inlet 12 of the channel 18 and with the outlet 13 of the channel 23 when the sphere 10 is held in the open (second) position of FIG. 1. The discharge end or outlet 15 of the channel 18 is coaxial with the moving means 11 (defining the axis L) which can rotate the sphere 10 between its first and second positions.

FIGS. 1, 2, 5 and 6 show that the axis of the inlet 12 of the channel 18 is at least substantially normal to the axis of the outlet 15, and that the inlet 17 of the channel 23 constitutes a portion of an annulus which surrounds the outlet 15 of the channel 18.

Figure 6:
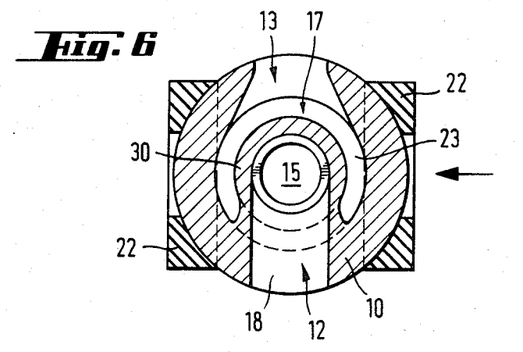
FIG. 6 is a similar fragmentary sectional view but showing the valving element in a different angular position.
Figure 7:
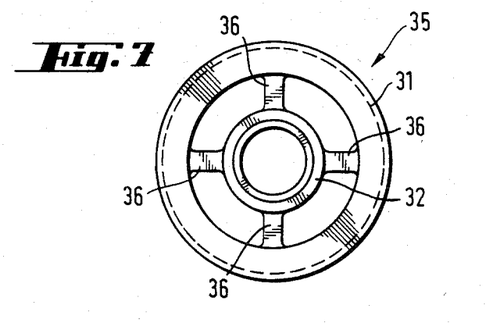
FIG. 7 is a plan view of a fluid-influencing component which constitutes a tubular filter and can be used in the valve of FIGS. 1 to 6.

The casing 8 is separably coupled to the valve housing 7 so as to afford convenient access to the insert 5 and rapid reattachment of the casing 8 to the housing 7. A locking device 24 is provided to ensure that the casing 8 can be uncoupled from the housing 7 only when the sphere 10 of the valving element 9 is moved to the first or sealing position in which the passages 33, 21 are sealed from each other and are also sealed from the interior of the casing 8. The sealing position of the sphere 10 is shown in FIG. 6. An advantage of such construction of the valve 1 that the casing 8 can be detached from the housing 7 only when the sphere 10 prevents the flow of fluid between the passages 33, 21 as well as between such passages and the interior of the casing 8 is that no fluid can leave the housing 7 during detachment of the casing 8 and/or while the casing 8 is actually detached from the housing 7.

Figure 3:
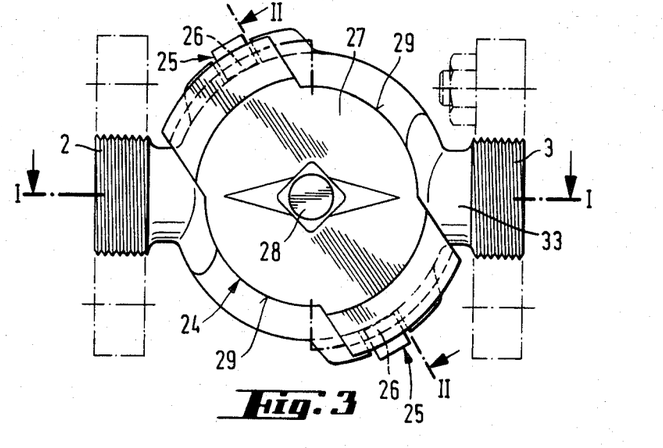
FIG. 3 is a plan view of the valve, with the valving element in open position.
Figure 4:
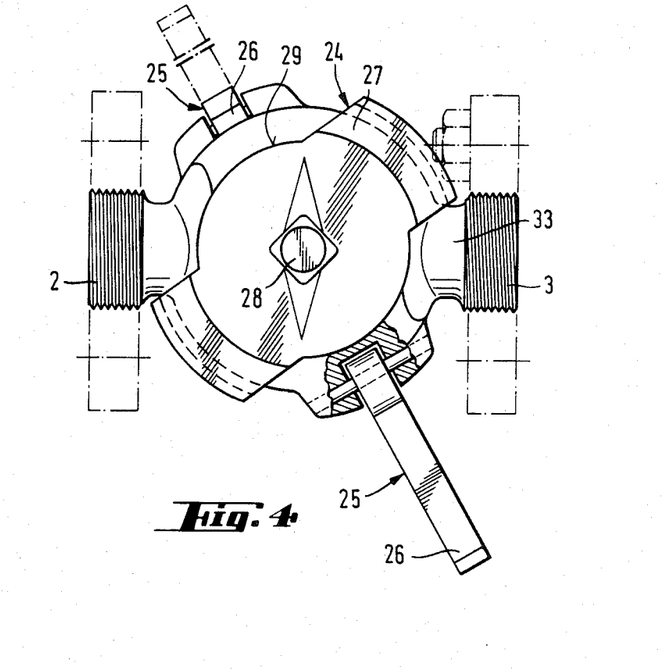
FIG. 4 is a similar plan view but with the valving element in closed position and one of the coupling members for the casing in its releasing or inoperative position.
Figure 5:
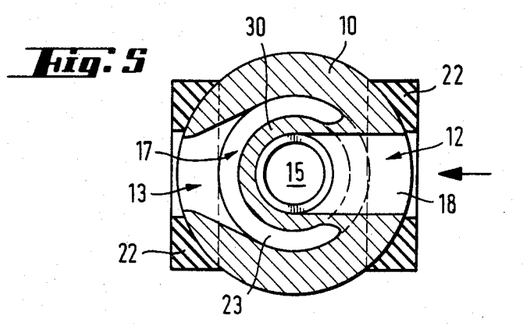
FIG. 5 is a fragmentary sectional view as seen in the direction of arrows from the line V—V of FIG. 1.

The means for releasably coupling the housing 8 to the casing 7 comprises coupling members in the form of levers 25 having eccentric portions 40 and being pivotally mounted on an annular skirt 37 of the housing 7. The pivot members for the coupling levers 25 extend substantially tangentially of the casing 8. The free end portions 26 of the levers 25 are movable between inoperative positions (shown by phantom lines for one such lever in the left-hand portion of FIG. 2) and operative positions (shown in FIG. 2 by solid lines) in which the end portions 26 can be engaged by the locking device 24 to prevent pivoting of the levers 25 back to the inoperative positions until and unless the sphere 10 of the valving element 9 is moved to its sealing position. The locking device 24 comprises a yoke 27 which overlies the free end portions 26 of the levers 25 in the operative positions of such levers and which is turnable with the sphere 10 between the positions which are shown in FIGS. 3 and 4. In FIG. 3, the yoke 27 holds the levers 25 against pivotal movement from their operative positions; in FIG. 4, the yoke 27 is out of the way so that each of the levers 25 (two such levers are shown) can pivot between its operative and inoperative positions.

The moving means 11 for rotating the sphere 10 and the yoke 27 about the axis L comprises a shaft 28 which is rotatable relative to the housing 7. It can be said that the yoke 27 of the safety locking device 24 resembles a cup which has cutouts 29 allowing the levers 25 to pivot between operative and inoperative positions when the yoke assumes the angular position of FIG. 4.

The sphere 10 of the valving element 9 and the sealing elements 22 are installed in a chamber CH which is defined by the housing 7 between the passages 33 and 21.

The channel 18 and the annular outlet 17, which surrounds the channel 18, are separated from each other by a partition 30 and their cross-sectional areas are at least substantially identical. The filter 6 has an externally threaded ring-shaped portion 31 which mates with a portion of the housing 7. A substantially tubular extension 32 of the filter 6 extends into the outlet 15 of the channel 18 in the sphere 10 to thus establish a path for the flow of fluid from the passage 33 into the internal space 16 of the filter 6 when the latter is properly attached to the housing 7. The space 34 around the filter 6 communicates with the passage 21 and the interior of the illustrated section of the pipe line 19 via channel 23. The sleeve-like portion 35 (see also FIG. 7) of the filter 6 between the extension 32 and the threaded portion 31 is formed with spaced-apart ribs or webs 36 defining slots which allow for the flow of treated (filtered) fluid from the space 16 into the passage 21, i.e., into the channel 23 of the sphere 10. As mentioned above, the direction of fluid flow can be changed, i.e., the fluid can enter via passage 21 to leave via passage 33 or vice versa.

The annular skirt 37 of the housing 7 surrounds the adjacent portion of the casing 8 and carries the aforementioned pivots for the coupling levers 25. The end face at the open end of the casing 8 bears against a ring-shaped gasket 38 which preferably consists of a relatively soft deformable elastomeric material.

The casing 8 has an external circumferential groove 39 which constitutes a socket for the eccentric portions 40 of coupling levers 25 when these levers assume their operative positions in which the casing 8 is secured to the valve housing 7. The groove or socket 39 is surrounded by the skirt 37, and the latter has apertures (see FIG. 2) for the eccentric portions 40. The socket 39 is preferably bounded by a concave surface whose depth matches or approximates the radius of its curvature. When the eccentric portions 40 extend into the socket 39, i.e., when the coupling levers 25 are held in the operative positions, the aforementioned edge face surrounding the open end of the casing 8 is biased against the gasket 38 in the housing 7.

The yoke 27 of the device 24 preferably further constitutes a means for limiting the extent of angular movement of the sphere 10 between its first and second positions. As can be seen in FIGS. 3 and 4, the yoke 27 can abut against different portions of the housing 7 in the two end positions of the sphere 10. The shaft 28 has a polygonal portion (e.g., a portion having a square or a hexagonal outline) which can be engaged by a wrench or another suitable tool 41 to change the angular position of the sphere 10. The latter can be replaced with a cone or an analogous valving element without departing from the spirit of the invention, as long as the valving element is capable of sealing its channels from the passages in the housing 7 in one of the two end positions of the valving element.

Figure 8:
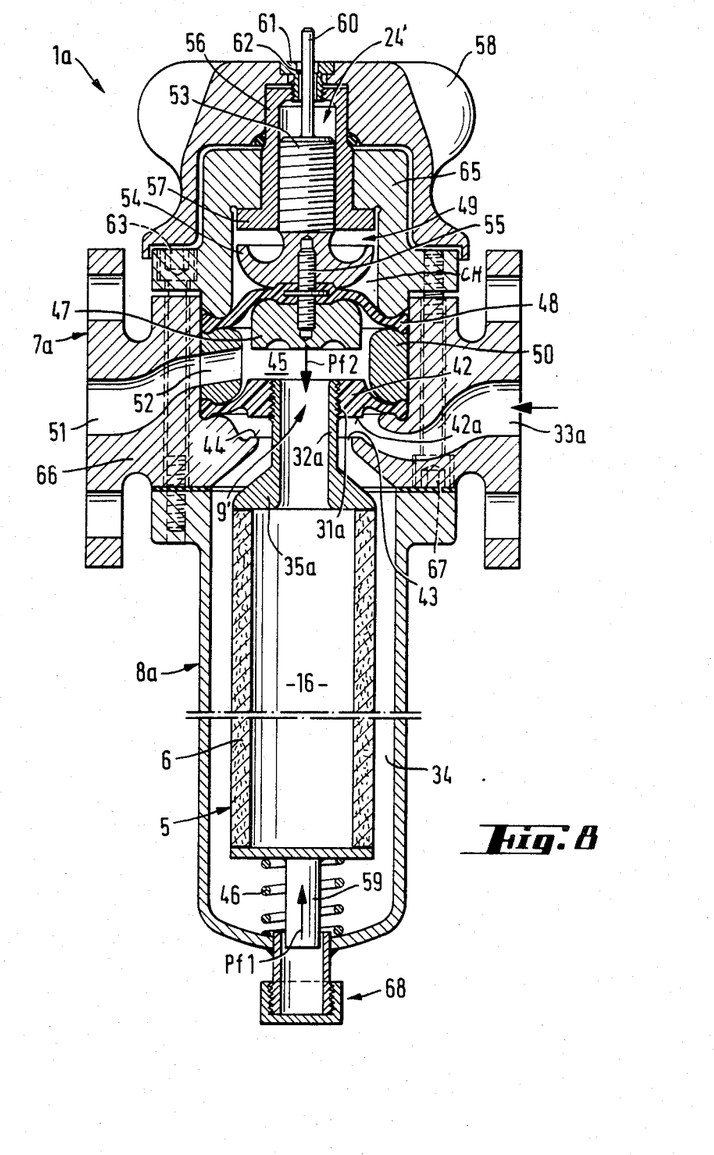
FIG. 8 is an axial sectional view of a valve which embodies a second form of the invention and wherein the valving element comprises a deformable membrane and a reciprocable displacing member for the membrane, the valving element being shown in an open position in which the membrane is spaced apart from a seat in the housing, the section being taken in the direction of arrows as seen from the line VIII—VIII of FIG. 10.
Figure 9:
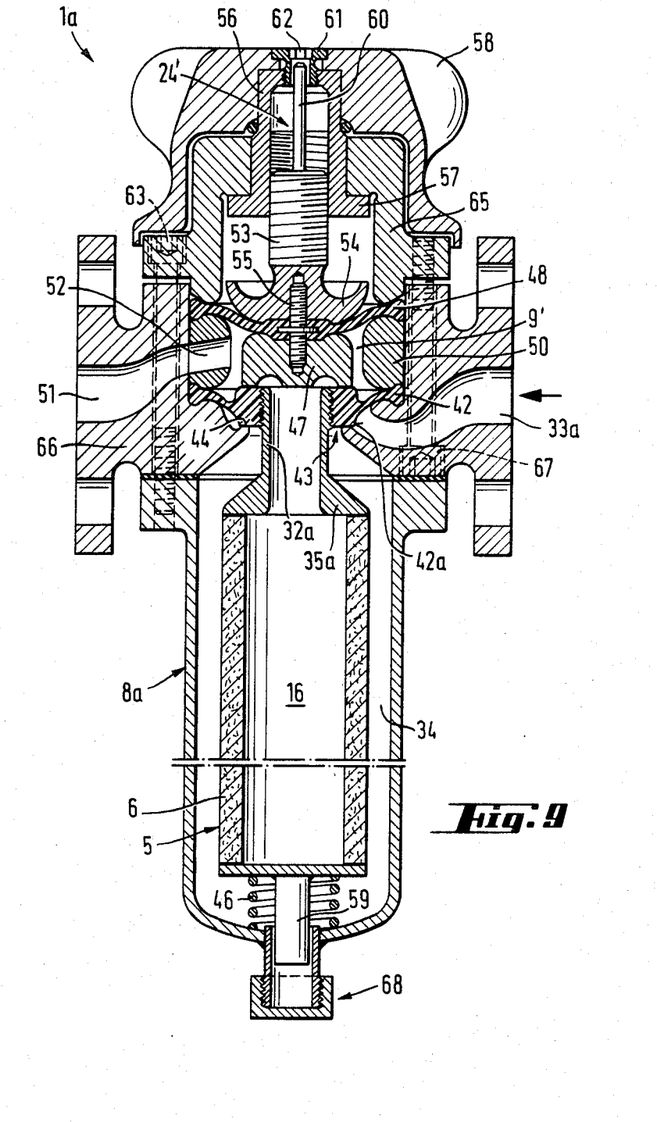
FIG. 9 illustrates the valve of FIG. 8 but with the valving element in closed position, namely, when the displacing member maintains the membrane in sealing engagement with the seat.
Figure 10:
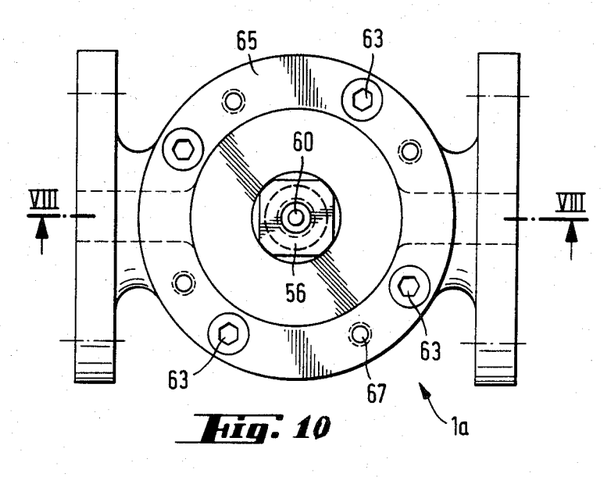
FIG. 10 is a plan view of the valve which is shown in FIGS. 8 and 9, with the handgrip portion of the means for moving the valving element removed.

FIGS. 8, 9 and 10 illustrate a modified valve 1a wherein the valving element 9' comprises a ring-shaped membrane 42 with a thickened central portion 42a which is held in an open position (shown in FIG. 8) when it is spaced apart from a seat 44 formed by the housing 7a and having an annular surface surrounding the component 5 in a somewhat modified casing 8a. The internal space 16 of the tubular filter 6 at one side of the membrane 42 communicates with a fluid-discharging passage 51 which is disposed at the other side of the membrane 42 and allows the fluid to issue from the housing 7a. The membrane 42 seals the passage 51 from a passage 33a which admits fluid into the space 34 around the filter 6 in the casing 8a. The filter 6 of the component 5 comprises an upper end portion 35a in the form of a nipple the topmost part or extension 32a of which extends into the central aperture of the membrane 42. It is presently preferred to provide the extension 32a of the nipple 35a with external threads 31a which mate with the internal threads of the membrane 42.

The filter 6 is biased lengthwise (note the arrow Pf1 in FIG. 8) by a resilient element here shown as a coil spring 46 which reacts against the closed end of the casing 8a and urges the entire filter upwardly, as viewed in FIG. 8, i.e., the spring 46 tends to lift the membrane 42 off its seat 44. The membrane 42 cooperates with a displacing member 47 which is shiftable in the direction indicated by arrow Pf2, i.e., counter to the direction in which the spring 46 tends to move the membrane 42 away from the seat 44. FIG. 8 shows the displacing member 47 of the valving element 9' in raised position in which the underside of the member 47 and the membrane 42 define a transverse channel 45 for the flow of a fluid from the internal space 16 of the filter 6 into the passage 51 of the valve body 7a. The upper side of the channel 45 is sealed from the exterior of the valve body or housing 7a by a diaphragm 48 whose beaded marginal portion is clamped in the housing 7a and whose central portion is connected with the displacing member 47 to share the movements in and counter to the direction indicated by the arrow Pf2. The diaphragm 48 invariably seals the parts 42, 47 of the valving element 9' from the means 49 for moving the displacing member 47, i.e., from the mechanism which can move the member 47 in and counter to the direction indicated by the arrow Pf2.

The housing 7a is assembled of several sections which cooperate with one another and with a ring-shaped sealing and distancing device 50 to sealingly engage and hold the beaded outer marginal portions of the membrane 42 and diaphragm 48. The sealing device 50 spacedly surrounds the displacing member 47. A radial bore 52 of the sealing device 50 defines a path for the flow of fluid between the channel 45 and the passage 51 so that the fluid can flow from the internal space 16 of the filter 6 to leave the housing 7a when the valving element 9' is held in the position shown in FIG. 8.

The moving means 49 comprises a feed screw 53 which is connected with the diaphragm 48 as well as with the displacing member 47. To this end, the feed screw 53 comprises a cupped pressure-applying element 54 which overlies the diaphragm 48 and has an externally threaded extension or stub 55 extending into a tapped axial bore of the displacing member 47. The stub 55 extends through a central aperture of the diaphragm 48 whose central portion is clamped between the pressure-applying element 54 and the displacing member 47.

The feed screw 53 is movable up and down in a rotary sleeve-like internally threaded nut 56 of the moving means 49. The nut 56 is rotatably mounted in the valve housing 7a and is rotatable by a handgrip member here shown as a hand wheel 58. The inner end portion of the nut 56 has an external flange 57 which abuts against an internal surface of the housing 7a so that the nut can rotate in but cannot move axially of the housing. Consequently, rotation of the nut 56 (through the medium of the hand wheel 58) entails a corresponding axial movement of the feed screw 53 and of the parts 54, 48 and 47.

If the valving element 9' of the valve 1a is to seal the passages 33a and 51 from each other, the hand wheel 58 is rotated in a direction to move the displacing member 47 toward and into engagement with the respective side of the membrane 42 so that the cross-sectional area of the channel 45 is reduced to zero. The feed screw 53 can continue to move the displacing member 47 downwardly (i.e., after the latter reduces the cross-sectional area of the channel 45 to zero) whereby the central portion of the membrane 42 shares such downward movement and causes the bottom end wall of the filter 6 to move counter to the direction indicated by arrow Pf1 by simultaneously stressing the coil spring 46. The bottom wall of the filter 6 has a coaxial projection or stud 59 which is reciprocable in a tubular guide of the casing 8a. Such downward movement of the central portion of the membrane 42 results in sealing engagement between the membrane 42 and its seat 44 so that the passages 33a and 51 are fully sealed from one another. Furthermore, the passage 33a is sealed from the space 34 which is defined by the casing 8a and the filter 6 therein because the seat 44 surrounds the opening 43 through which the passage 33a can communicate with the space 34 in the open position of the membrane 42.

The feed screw 53 is rigid with a coaxial pin-shaped or stud-shaped blocking and position-indicating device 60 which extends beyond the outer side of the housing 7a when the valving element 9' is held in the open position, i.e., when the membrane 42 is not in sealing engagement with the seat 44. The device 60 then extends into the central socket 62 of a fastening screw 61 which separably secures the hand wheel 58 to the rotary nut 56. The socket 62 is bounded, at least in part, by a polygonal surface which can be engaged by the complementary external polygonal surface of a suitable tool serving to allow for removal of the screw 61, i.e., for detachment of the hand wheel 58 from the nut 56. This is possible only when the valving element 9' including the membrane 42 and the displacing member 47 is held in the sealing position of FIG. 9 or 10, i.e., when the membrane 42 bears against the seat 44.

When the hand wheel 58 is detached from the nut 56, the attendant can gain access to several bolts 63 or analogous fastening means which serve to separably connect the casing 8a with the housing 7a. Thus, the valve 1a is also designed in such a way that the casing 8a can be detached only and alone when the valving element 9' assumes its sealing position. The hand wheel 58 forms part of a locking device 24' which ensures that the casing 8a can be detached from the housing 7a only when the membrane 42 engages the seat 44, i.e., this is a prerequisite for separation of the casing 8a from the valve housing 7a. In other words, the operators can gain access to the fastening means 63 and thereafter to the filter 6 in the casing 8a only when the passages 33a, 51 are sealed from one another and when the membrane 42 seals the passage 33a from the space 34 surrounding the filter 6 in the casing 8a. This invariably prevents unintentional or unauthorized escape or spillage of a fluid from the valve 1a when the casing 8a is detached from the housing 7a.

FIG. 10 shows the housing 7a in a top plan view, with the hand wheel 58 removed, i.e., the fastening means 63 are readily accessible preparatory to detachment of the casing 8a from the housing 7a.

The tubular guide at the lower end of the casing 8a is provided with a threaded cap 68 which can be detached from the guide in order to allow for evacuation of fluid from the interior of the casing 8a. Thus, the tubular guide for the post 59 of the filter 6 can be said to constitute a sealable outlet for evacuation of fluid from the casing 8a. The manner in which the contents of the casing 8 can be evacuated is analogous, i.e., the end wall of the casing 8 has a tapped bore for a bolt 68' which can be removed by a suitable tool to permit evacuation of the contents of the casing 8.

Figure 11:
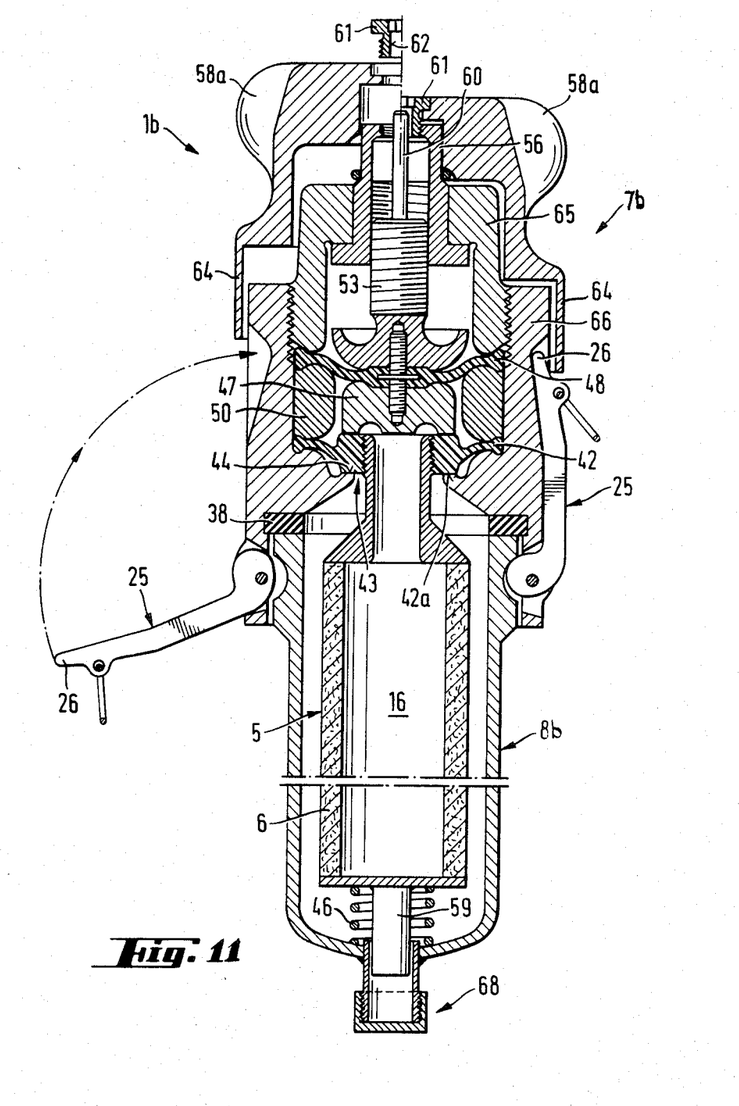
FIG. 11 is an axial sectional view of a valve which embodies a further form of the invention, the valving element being shown in closed position and the section being taken in the direction of arrows as seen from the line XI—XI of FIG. 12.
Figure 12:
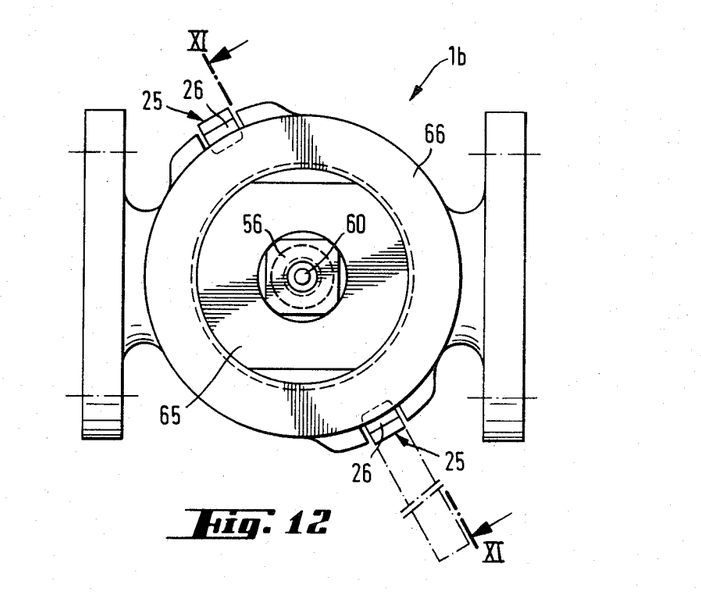
FIG. 12 is a plan view of the valve which is shown in FIG. 11, with the handgrip member of the means for moving the valving element detached from the housing.

FIGS. 11 and 12 illustrate a third valve 1b which is provided with a modified locking device. The means for separably coupling the casing 8b to the housing 7b comprises coupling members in the form of levers 25 which are substantially identical with the levers 25 used in the embodiment of FIGS. 1 to 7. The hand wheel 58a has a skirt or apron 64 which can overlie the end portions 26 of the levers 25 when the levers assume their operative position (see the right-hand lever 25 of FIG. 11) so that movements of the levers 25 to their inoperative positions (in which the casing 8b can be detached from the housing 7b) is possible only upon removal of the hand wheel 58a, i.e., upon detachment of this hand wheel from the nut 56. This, in turn, is possible only when the membrane 42 of the valving element shown in FIG. 11 assumes its sealing position, i.e., when the passages of the housing 7b are sealed from one another as well as from the space surrounding the filter 6 in the casing 8b. It will be noted that the locking device of FIGS. 11 and 12 exhibits a combination of features of the locking devices which are shown in FIGS. 1–7 and in FIGS. 8–10. The blocking and position-indicating element 60 of FIG. 11 serves the same purpose as the similarly referenced element of the embodiment shown in FIGS. 8 to 10.

A further difference between the valves 1a and 1b is that, in the embodiment of FIGS. 11 and 12, the two sections 65 and 66 of the housing 7b are threadedly connected with one another (i.e., one of these sections has a male portion which mates with a female portion of the other section), whereas the housing 7a of the valve 1a comprises several sections (including those denoted by the characters 65 and 66) which are separably held together by screws, bolts or analogous threaded fasteners 67.

FIG. 12 shows the housing of the valve 1b in a top plan view, with the hand wheel 58a removed. The left-hand portion of FIG. 11 also shows the hand wheel 58a in detached position, i.e., with the screw 61 detached from the nut 56.

It will be readily appreciated that the improved valve is susceptible of being used as a simple shutoff valve. Thus, the component 5 can be removed from the casing 8, 8a or 8b and the valve 1, 1a or 1b is then capable of being used not unlike a conventional shutoff valve except that its valving element invariably seals the two passages from one another as soon as it is caused to assume its sealing position. The component 5 can be left in the casing 8, 8a or 8b even if there is no need to remove impurities from the fluid which flows between the two sections of the pipeline.

Another important advantage of the improved valve is that it occupies little room between two sections of a pipeline and that it can be installed or removed and its insert inspected or replaced with little loss in time.

All embodiments of the improved valve share the advantage that (if the component 5 includes or constitutes a filter 6) unfiltered fluid cannot escape from the housing 7, 7a or 7b when the casing 8, 8a or 8b is completely or partially removed so as to afford access to the component 5. Furthermore, all embodiments of the improved valve share the advantage that the casing 8, 8a or 8b can be removed (either entirely or in part) only when the valving element is held in the first or closed position in which the two passages of the housing are completely sealed from one another and in which (at least in the embodiments of FIGS. 8–10 and 11–12) channel or channels of the valving element are also sealed from the interior of the casing.

The valving element 9 of FIGS. 1 to 7 is relatively simple and its channels can be readily sealed from the passages of the housing 7 in response to rotation of the shaft 28 through 90 degrees. The valving element which embodies one or more membranes is preferred in connection with the regulation of flow of certain fluids, for example, when it is desirable to avoid any movements of the valving element (or its parts) relative to one or more sealing elements and/or vice versa.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A valve, comprising a housing having a fluid-admitting first passage, a fluid-discharging second passage which is substantially coaxial with said first passage, and a chamber between said passages; a hollow casing provided on said housing, said casing being at least partially separable from said housing; means for releasably coupling said casing to said housing, said coupling means urging said casing and said housing towards one another; a valving element in said chamber including a substantially spherical body rotatable about an axis which is substantially normal to the common axis of said passages; means for rotating said body between a first position in which said body seals said passages from one another and a second position in which said passages are free to communicate with one another and with the interior of said casing, said body having discrete first and second channels which respectively communicate with said first and second passages in the second position of said body, and said first channel resembling an elbow and having a first inlet and a first outlet which respectively open to said first passage and said casing in the second position of said body, said second channel having a second inlet and a second outlet which respectively open to said casing and said second passage in the second position of said body, and said first inlet being substantially coaxial with said second outlet, said body having a partition which separates said first outlet from said second inlet, and one of said first outlet and second inlet being surrounded by the other and being substantially centered with respect to the axis of rotation of said body, said rotating means including a shaft-like member which is substantially coaxial with said first outlet and second inlet; sealing elements disposed between said body and said housing; and means for preventing release of said coupling means in the second position of said body.

2. The valve of claim 1, further comprising a fluid-influencing component in said casing, the interior of said casing being in communication with both said passages in the second position of said valving element so as to allow the fluid which enters the housing via said first passage to be influenced by said component while flowing toward said second passage.

3. The valve of claim 1, wherein said channels are in communication with one another via the interior of said casing, at least in the second position of said spherical body.

4. The valve of claim 3, further comprising a fluid-influencing component in said casing, said component having a first and second side and said channels communicating with said casing at the opposite sides of said component in the second position of said spherical body.

5. The valve of claim 1, wherein said spherical body is rotatable through substantially 90 degrees between said first and second positions thereof.

6. The valve of claim 1, wherein said coupling means comprises at least one coupling member which is movably mounted on one of the parts including said casing and said housing and is movable into and from retaining engagement with the other of said parts in the first position of said spherical body.

7. The valve of claim 6, wherein said coupling member includes a lever which is pivotable relative to said one part and includes an eccentric portion engaging the other of said parts when said lever is in retaining engagement with said other part.

8. The valve of claim 6, wherein said preventing means comprises a device which holds said coupling member against movement from retaining engagement with said other part in the second position of said spherical body.

9. The valve of claim 8, wherein said device is turnable between first and second positions in which it respectively holds said coupling member against movement and permits said coupling member to move from retaining engagement with said other part.

10. The valve of claim 9, wherein said moving means includes means for rotating said spherical body simultaneously with said device.

11. The valve of claim 1, further comprising a filter installed in said casing and having a tubular extension received in said first outlet.

12. The valve of claim 11, wherein said filter is a tubular body and said first channel communicates with said first passage in the second position of said spherical body so that fluid which enters via said first passage can flow through said extension and into the interior of said filter on its way into said second passage in the second position of said spherical body.

13. The valve of claim 11, wherein said filter is a tubular body and said first channel communicates with said second passage in the second position of said spherical body, said first passage being arranged to admit fluid into said casing around said filter so that the fluid which enters the housing through said first passage flows into said casing, passes through said filter and enters said second passage through said extension in the second position of said spherical body.

14. The valve of claim 1, further comprising a fluid-influencing component removably installed in said casing, said component and said housing having mating threads which separably connect the component to said housing.

15. The valve of claim 14, wherein said component includes a sleeve-like portion provided with external threads mating with internal threads of said housing, said sleeve-like portion further having at least one slot through which the fluid can flow between said passages, at least in the second position of said spherical body.

16. The valve of claim 1, wherein said casing has a sealable outlet for evacuation of fluid from its interior.

17. A valve, comprising a housing having a fluid-admitting first passage, a fluid-discharging second passage, and a chamber between said passages; a hollow casing provided on said housing, said casing being at least partially separable from said housing; means for releasably coupling said casing to said housing, said coupling means urging said casing and said housing towards one another; a valving element in said chamber including a membrane, and a displacing member for said membrane movable relative to and with the latter; means for moving said valving element between a first position in which said element seals said passages from one another and a second position in which said passages are free to communicate with one another and with the interior of said casing, said housing having an opening which communicates with the interior of said casing and said housing defining a seat which surrounds said opening, and said membrane defining a clearance with said seat in the second position of said valving element to thereby establish communicate between one of said passages and the interior of said casing, said membrane bearing against said seat in the first position of said valving element to seal said one passage from the interior of said casing, and said membrane having an aperture which establishes communicate between the other of said passages and the interior of said casing in the second position of said valving element, said displacing member being arranged to seal said aperture in the first position of said valving element and to cooperate with said membrane in the second position of said valving element to define a channel which connects said aperture with said other passage; a diaphragm interposed between said moving means and said valving element and sealing said moving means from fluid flowing through said housing and said casing; and means for preventing release of said coupling means in the second position of said valving element.

18. The valve of claim 17, wherein said moving means comprises a feed screw rotatably mounted in said housing, a rotary handgrip member for rotating said feed screw, and means for separably securing said handgrip member to said housing, said coupling means being accessible upon detachment of said handgrip member from said housing.

19. The valve of claim 18, wherein said preventing means blocks the detachment of said handgrip member from said housing in the second position of said spherical body so that said casing is separable from said housing only when said spherical body assumes said first position thereof.

20. The valve of claim 19, wherein said securing means comprises a screw having a socket bounded by a polygonal surface which must be engaged by a tool to detach said screw from said housing and to thus permit removal of said handgrip member, said preventing means including a projection which extends into said socket in the second position of said spherical body to thus prevent access to said polygonal surface.

21. The valve of claim 17, further comprising a ring-shaped sealing device disposed between said membrane and said diaphragm and surrounding said displacing member, said sealing device defining a path for the flow of fluid from said first to said second passage in the second position of said valving element.

22. The valve of claim 17, further comprising a fluid-influencing component in said casing, and means for separably connecting said component to said membrane.

23. The valve of claim 22, wherein said component includes a filter and said connecting means includes mating threads on said filter and said membrane.

24. The valve of claim 22, wherein said component is movable in said casing; and further comprising means for biasing said component in a direction to urge said valving element to said second position.

25. The valve of claim 24, wherein said biasing means comprises a spring.

* * * * *